US008861231B2

(12) United States Patent
Cross et al.

(10) Patent No.: US 8,861,231 B2
(45) Date of Patent: Oct. 14, 2014

(54) CONVERTER (75) Inventors: Andrew Cross, Great Haywood (GB); David Trainer, Alvaston (GB); William Crookes, Salt (GB)

(73) Assignee: Alstom Technology Ltd, Baden (CH)

( * ) Notice: Subject to any disclaimer, the term of this patent is extended or adjusted under 35 U.S.C. 154(b) by 40 days.

(21) Appl. No.: 13/576,920

(22) PCT Filed: Feb. 9, 2010

(86) PCT No.: PCT/EP2010/051572
§ 371 (c)(1),
(2), (4) Date: Oct. 4, 2012

(87) PCT Pub. No.: WO2011/098117
PCT Pub. Date: Aug. 18, 2011

(65) Prior Publication Data
US 2013/0182467 A1 Jul. 18, 2013

(51) Int. Cl.
*H02J 3/36* (2006.01)
*G05F 1/70* (2006.01)
(52) U.S. Cl.
USPC .............................. 363/35; 323/207
(58) Field of Classification Search
USPC .................. 323/205, 207; 363/35, 78, 81, 84, 363/123–127
See application file for complete search history.

(56) References Cited

U.S. PATENT DOCUMENTS

| | | |
|---|---|---|
| 3,867,643 A | 2/1975 | Baker |
| 4,053,820 A | 10/1977 | Peterson et al. |
| 4,663,702 A | 5/1987 | Tanaka |
| 4,816,736 A | 3/1989 | Dougherty et al. |
| 5,093,583 A | 3/1992 | Mashino et al. |
| 5,345,375 A | 9/1994 | Mohan |
| 5,499,178 A | 3/1996 | Mohan |
| 5,515,264 A | 5/1996 | Stacey |

(Continued)

FOREIGN PATENT DOCUMENTS

| | | |
|---|---|---|
| DE | 195 35 552 A1 | 4/1996 |
| DE | 10103031 A1 | 7/2002 |

(Continued)

OTHER PUBLICATIONS

Hagiwara, Makoto et al., "PWM Control and Experiment of Modular Multilevel Converters", Power Electronics Specialists Conference, PESC 2008, IEEE, Piscataway, NJ, USA, pp. 154-161 (2008).

(Continued)

*Primary Examiner* — Adolf Berhane
(74) *Attorney, Agent, or Firm* — Nixon Peabody LLP (57) ABSTRACT

A voltage source converter comprising three phase elements defining a star connection in which a first end of each phase element is connected to a common junction; at least two converter limbs, each converter limb including first and second DC terminals for connection in use to a DC network and an AC terminal connected in series with a second end of a phase element, each converter limb defining first and second limb portions, including a chain-link converter, each chain-link converter including chain-link modules; and a third DC terminal connected to the common junction of the star connection to define an auxiliary connection, wherein in use a current is injected into the auxiliary connection to modify a voltage of each chain-link module in each limb portion.

22 Claims, 5 Drawing Sheets

(56) References Cited

U.S. PATENT DOCUMENTS

| | | | |
|---|---|---|---|
| 5,532,575 A | 7/1996 | Ainsworth | |
| 5,644,482 A | 7/1997 | Asplund | |
| 5,673,189 A | 9/1997 | Schettler | |
| 5,719,486 A | 2/1998 | Taniguchi et al. | |
| 5,726,557 A | 3/1998 | Umeda et al. | |
| 5,889,667 A | 3/1999 | Bernet | |
| 5,892,677 A | 4/1999 | Chang | |
| 5,936,855 A | 8/1999 | Salmon | |
| 5,999,422 A | 12/1999 | Goransson et al. | |
| 6,134,126 A | 10/2000 | Ikekame et al. | |
| 6,236,580 B1 | 5/2001 | Aiello et al. | |
| 6,301,130 B1 | 10/2001 | Aiello et al. | |
| 6,320,767 B1 | 11/2001 | Shimoura et al. | |
| 6,392,348 B1 | 5/2002 | Dougherty | |
| 6,879,062 B2 | 4/2005 | Oates | |
| 6,987,680 B2 | 1/2006 | Vire et al. | |
| 7,170,767 B2 | 1/2007 | Bixel | |
| 7,274,576 B1 | 9/2007 | Zargari et al. | |
| 7,292,462 B2 | 11/2007 | Watanabe et al. | |
| 7,298,115 B2 | 11/2007 | Nishimura et al. | |
| 7,499,291 B2 * | 3/2009 | Han | 363/17 |
| 7,622,825 B2 | 11/2009 | Brune et al. | |
| 8,188,720 B2 | 5/2012 | Kim et al. | |
| 8,390,259 B2 * | 3/2013 | Dommaschk et al. | 320/166 |
| 8,599,591 B2 | 12/2013 | Crookes et al. | |
| 2003/0202367 A1 | 10/2003 | Schreiber | |
| 2004/0218318 A1 | 11/2004 | Bijlenga et al. | |
| 2005/0127853 A1 | 6/2005 | Su | |
| 2005/0135126 A1 | 6/2005 | Gazel et al. | |
| 2005/0146226 A1 | 7/2005 | Trainer et al. | |
| 2008/0002443 A1 | 1/2008 | Ueda et al. | |
| 2008/0007978 A1 * | 1/2008 | Han | 363/35 |
| 2008/0179951 A1 | 7/2008 | Brune et al. | |
| 2008/0205093 A1 | 8/2008 | Davies et al. | |
| 2008/0310205 A1 | 12/2008 | Hiller | |
| 2009/0027934 A1 | 1/2009 | Bustos | |
| 2009/0085548 A1 | 4/2009 | Suh et al. | |
| 2009/0102436 A1 | 4/2009 | Valderrama et al. | |
| 2009/0206781 A1 | 8/2009 | Itoh et al. | |
| 2010/0067266 A1 | 3/2010 | Dommaschk et al. | |
| 2010/0118578 A1 | 5/2010 | Dommaschk et al. | |
| 2010/0309698 A1 * | 12/2010 | Asplund et al. | 363/126 |
| 2011/0018481 A1 | 1/2011 | Hiller | |
| 2011/0205768 A1 | 8/2011 | Svensson | |
| 2011/0260701 A1 * | 10/2011 | Horger et al. | 323/207 |
| 2012/0026767 A1 | 2/2012 | Inoue et al. | |
| 2012/0069610 A1 * | 3/2012 | Trainer et al. | 363/35 |
| 2012/0113699 A1 * | 5/2012 | Crookes et al. | 363/126 |
| 2012/0120697 A1 | 5/2012 | Cuk | |
| 2012/0127766 A1 | 5/2012 | Crookes et al. | |
| 2012/0170338 A1 | 7/2012 | Trainer et al. | |
| 2012/0182771 A1 | 7/2012 | Trainer et al. | |
| 2012/0188803 A1 * | 7/2012 | Trainer et al. | 363/37 |
| 2013/0026841 A1 | 1/2013 | Hosini et al. | |
| 2013/0051105 A1 * | 2/2013 | Wang et al. | 363/132 |
| 2013/0094264 A1 | 4/2013 | Crookes et al. | |
| 2013/0119970 A1 | 5/2013 | Trainer et al. | |
| 2013/0128629 A1 * | 5/2013 | Clare et al. | 363/35 |
| 2013/0128636 A1 * | 5/2013 | Trainer et al. | 363/65 |
| 2013/0194838 A1 | 8/2013 | Jang et al. | |
| 2013/0208514 A1 * | 8/2013 | Trainer et al. | 363/35 |
| 2013/0208521 A1 * | 8/2013 | Trainer et al. | 363/126 |
| 2013/0279211 A1 * | 10/2013 | Green et al. | 363/35 |
| 2014/0098575 A1 | 4/2014 | Whitehouse | |
| 2014/0146583 A1 | 5/2014 | Trainer et al. | |

FOREIGN PATENT DOCUMENTS

| | | | |
|---|---|---|---|
| EP | 1 800 391 A2 | 6/2007 | |
| GB | 2 294 821 A | 5/1996 | |
| GB | 2 418 079 A | 3/2006 | |
| WO | 97/02639 A1 | 1/1997 | |
| WO | 02/063758 A1 | 8/2002 | |
| WO | 03/055048 A1 | 7/2003 | |
| WO | 2007/028349 A1 | 3/2007 | |
| WO | 2007/028350 A1 | 3/2007 | |
| WO | 2008/086760 A1 | 7/2008 | |
| WO | 2009/149743 | 12/2009 | |
| WO | 2010/025758 A1 | 3/2010 | |
| WO | 2010/069371 | 6/2010 | |
| WO | 2010/088969 | 8/2010 | |
| WO | 2010/145688 A1 | 12/2010 | |
| WO | 2010/145689 A1 | 12/2010 | |
| WO | 2010/145690 A1 | 12/2010 | |
| WO | 2010/149200 A1 | 12/2010 | |
| WO | 2011/012171 A1 | 2/2011 | |
| WO | 2011/012174 A1 | 2/2011 | |
| WO | 2011/050847 A1 | 5/2011 | |
| WO | 2011/113471 A1 | 9/2011 | |
| WO | 2011/124258 A1 | 10/2011 | |
| WO | 2011/127980 | 10/2011 | |
| WO | 2011/157300 | 12/2011 | |
| WO | 2012/013248 | 2/2012 | |
| WO | 2012/167826 | 12/2012 | |
| WO | 2013/000510 | 1/2013 | |

OTHER PUBLICATIONS

Leniscar, A. et al., "A new modular voltage source inverter topology", pp. 1-10 (2003) XP002454302.

Raju, N. Ravisekhar, "A DC Link-Modulated Three-Phase Converter", IEEE, pp. 2181-2185 (2001) XP010561989.

International Search Report and Written Opinion of the International Searching Authority, PCT/EP2010/051572, dated Jan. 19, 2011.

U.S. Appl. No. 13/639,844.

U.S. Appl. No. 13/805,333.

U.S. Appl. No. 13/378,336.

Hongbo, Jiang, et al., "Harmonic Cancellation of a Hybrid Converter", High Power Electronics, The Royal Institute of Technology, Stockholm Sweden, IEEE Transactions on Power Delivery, vol. 13, No. 4, Oct. 1998, pp. 1291-1296.

Liu, Y.H. et al., "A New STATCOM Configuration Using Multi-Level DC Voltage Reinjection for High Power Application", IEEE Transactions on Power Delivery, vol. 19, No. 4, Oct. 2004, New Zealand, pp. 1828-1834.

Liu, Y.H. et al., "A New High-Pulse Voltage-Sourced Converter for HVdc Transmission", IEEE Transactions on Power Delivery, vol. 18, No. 4, Oct. 2003, New Zealand, pp. 1388-1393.

Qahraman, B. et al., "A VSC Based Series Hybrid Converter for HVDC Transmission", IIEE 0-7803-8886-0/05 CCECE/CCGEI, Saskatoon, May 2005, pp. 458-461.

Su, Gui-Jia et al., "Multilevel DC Link Inverter for Brushless Permanent Magnet Motors with Very Low Inductance", Prepared by Oak Ridge National Laboratory for U.S. Dept. of Energy, 2001, IEEE 0-7803-7116-X/01, pp. 829-834.

Wong, C. et al., "Feasibility Study of AC and DC-Side Active Filters for HDVC Converter Terminals", IEEE Transactions on Power Delivery, vol. 4, No. 4, Oct. 1989, New York, NY, USA, pp. 2067-2075.

Zhang, W. et al., "Active DC Filter for HVDC Systems", IEEE Computer Applications in Power, vol. 7, No. 1, Jan. 1994, New York, USA, pp. 40-44.

PCT International Preliminary Report on Patentability in International Application No. PCT/EP2009/057388, mailed on Dec. 14, 2011.

PCT International Preliminary Report on Patentability in International Application No. PCT/EP2009/059973, mailed on Oct. 5, 2011.

PCT International Preliminary Report on Patentability in International Application No. PCT/EP2010/051572, mailed on Apr. 20, 2012.

PCT International Preliminary Report on Patentability in International Application No. PCT/EP2010/053290, mailed on Apr. 20, 2012.

PCT International Search Report and Written Opinion in International Application No. PCT/EP2010/054660, mailed on Feb. 24, 2011.

PCT International Preliminary Report on Patentability in International Application No. PCT/EP2010/054660, mailed on Jun. 6, 2012.

(56) References Cited

OTHER PUBLICATIONS

PCT International Search Report for International Application No. PCT/EP2010/054974, mailed on Mar. 4, 2011.
PCT International Preliminary Report on Patentability in International Application No. PCT/EP2010/054974, mailed on Aug. 10, 2012.
PCT International Preliminary Report on Patentability in International Application No. PCT/EP2010/058630, mailed on Dec. 19, 2012.
PCT International Preliminary Report on Patentability in International Application No. PCT/EP2010/061145, mailed on Aug. 20, 2012.
PCT International Preliminary Report on Patentability in International Application No. PCT/EP2011/059514, mailed on Aug. 1, 2013.
PCT International Preliminary Report on Patentability in International Application No. PCT/EP2011/060907, mailed on Sep. 24, 2013.
Office Action in U.S. Appl. No. 13/388,277, mailed on Nov. 22, 2013.
Notice of Allowance in U.S. Appl. No. 13/378,336, mailed on Feb. 6, 2014.
PCT International Search Report and Written Opinion in International Application No. PCT/EP2011/060907, mailed on Jul. 16, 2012.
PCT International Search Report and Written Opinion in International Application No. PCT/EP2011/059514, mailed on Jul. 5, 2012.
U.S. Appl. No. 14/124,704, filed Dec. 6, 2013.
U.S. Appl. No. 14/129,923, filed Dec. 27, 2013.
Allebrod, S. et al., "New Transformerless, Scalable Modular Multilevel Converters for HVDC—Transmission", Power Electronics Specialists Conference, IEEE, Jun. 15, 2007.
Knudsen, L. et al., "Description and Prospective Applications of New Multi-Terminal HVDC System Concepts", CIGRE Conf. Internationale des Grands Reseaux Electriques, Aug. 26-Sep. 1, 1990, pp. 1-11.
Glinka M., "Prototype of Multiphase Modular-Multilevel-Converter with 2MW Power Rating and 17-Level-Output-Voltage", 2004 35th Annual IEEE Power Electronics Specialists Conference, Jun. 20-25, 2004, pp. 2572-2576.
Lesnicar, A. et al., "An Innovative Modular Multilevel Converter Topology Suitable for a Wide Power Range", 2003 IEEE Bologna PowerTech Conference, Jun. 23-26, 2003, pp. 1-6.
Raju, N. Ravisekhar, "A DC Link-Modulated Three-Phase Converter", IEEE, pp. 2181-2185, (2001), XP010561989.
Baran M. E. et al., "Overcurrent Protection in DC Zonal Shipboard Power Systems uisng Solid State Protection Devices", Electric Ship Technologies Symposium, 2007. ESTS '07. IEEE, IEEE, PI, May 1, 2007, pp. 221-224.
Guanjun Ding et al., "New technologies of voltage source converter (VSC) for HVDC transmission system based on VSC", Power and Energy Society General Meeting—Conversion and Delivery of Electrical Energy in the 21st Century, 2008 IEEE, IEEE, Piscataway, NJ, USA, Jul. 20, 2008, p. 1-8.
PCT International Search Report and Written Opinion in International Application No. PCT/EP2010/053290, mailed on Feb. 11, 2011.
PCT International Search Report and Written Opinion in International Application No. PCT/EP2009/057388, mailed on Mar. 18, 2010.
PCT International Search Report and Written Opinion in International Application No. PCT/EP2009/057736, mailed on Mar. 26, 2010.
PCT International Search Report and Written Opinion in International Application No. PCT/EP2009/059973, mailed on Aug. 13, 2010.
PCT International Search Report and Written Opinion for Application No. PCT/EP2010/061145, mailed on Jun. 5, 2011.
PCT International Preliminary Report on Patentability in International Application No. PCT/EP2009/057736, mailed on Nov. 24, 2011.
PCT International Search Report and Written Opinion in International Application No. PCT/EP2010/058630, mailed on Apr. 19, 2011.
Notice of Allowance in U.S. Appl. No. 13/380,500, mailed on Jun. 11, 2013.
Notice of Allowance in U.S. Appl. No. 13/380,500, mailed on Jul. 31, 2013.
U.S. Appl. No. U.S. 13/639,844, filed Dec. 7, 2012.
U.S. Appl. No. 13/805,333, filed Feb. 14, 2013.
U.S. Appl. No. 13/378,336, filed Mar. 2, 2012.
First Chinese Office Action in Application No. 200980160700.4, mailed Jun. 25, 2014.
Office Action in U.S. Appl. No. 13/388,277, mailed on Jul. 3, 2014.
Office Action in U.S. Appl. No. 13/639,844, mailed on May 22, 2014.
Notice of Allowance in U.S. Appl. No. 13/640,468, mailed on Jun. 4, 2014.
Notice of Allowance in U.S. Appl. No. 13/813,414, mailed on Jun. 2, 2014.
Notice of Allowance in U.S. Appl. No. 13/818,654, mailed on May 30, 2014.
Notice of Allowance in U.S. Appl. No. 13/378,336, mailed on Jun. 13, 2014.

\* cited by examiner

CONVERTER

CROSS REFERENCE TO RELATED APPLICATIONS OR PRIORITY CLAIM

This application is a National Phase of PCT/EP2010/051572, filed Feb. 9, 2010, entitled, "CONVERTER FOR HIGH VOLTAGE DC DC TRANSMISSION", the contents of which are incorporated herein by reference in their entirety.

The invention relates to a voltage source converter for use in high voltage direct current (HVDC) power transmission and reactive power compensation.

In power transmission networks alternating current (AC) power is typically converted to direct current (DC) power for transmission via overhead lines and/or undersea cables. This conversion removes the need to compensate for the AC capacitive load effects imposed by the transmission line or cable, and thereby reduces the cost per kilometer of the lines and/or cables. Conversion from AC to DC thus becomes cost-effective when power needs to be transmitted over a long distance.

The conversion of AC to DC power is also utilized in power transmission networks where it is necessary to interconnect AC networks operating at different frequencies.

In any such power transmission network, converters are required at each interface between AC and DC power to effect the required conversion, and one such form of converter is a voltage source converter (VSC).

Figure 1A:
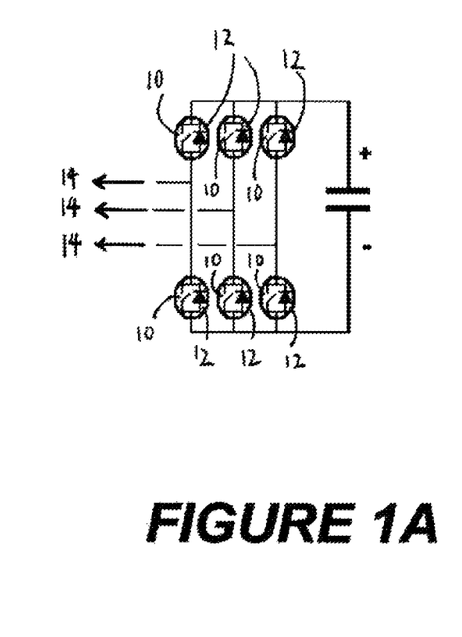
FIGS. 1A and 1B show, in schematic form, prior art voltage source converters.

One form of known voltage source converter is shown in FIG. 1A and includes six sets of series connected insulated gate bipolar transistors (IGBTs) 10 and anti-parallel diodes 12. The IGBTs 10 are connected and switched together in series to enable high power ratings of 10's to 100's of MW to be realized.

This approach however is likely to require a complex and active IGBT drive, and requires large passive snubber components to ensure that the high voltage across the series strings of IGBTs 10 shares properly during converter switching. In addition the IGBTs 10 need to switch on and off several times at high voltage over each cycle of the AC supply frequency to control the harmonic currents being fed to the AC network 14. These factors lead to high losses, high levels of electromagnetic interference and a complex design.

Figure 1B:
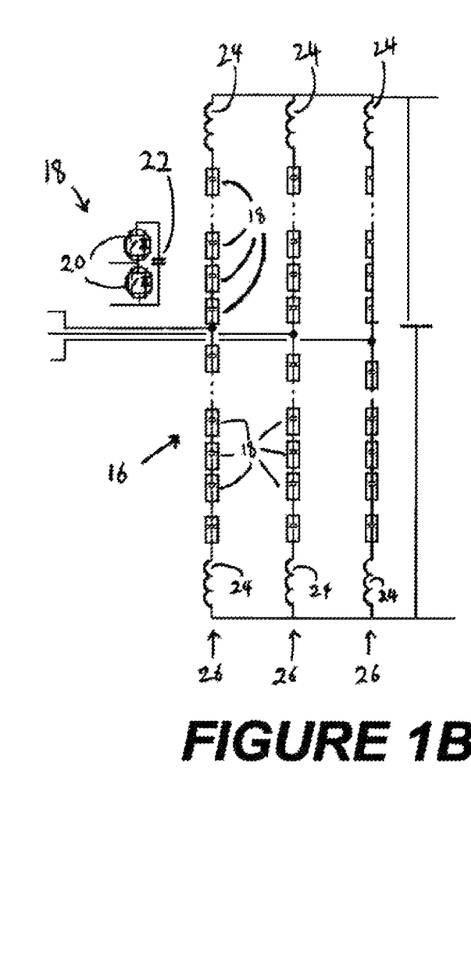

Another known voltage source converter is shown in FIG. 1B and includes a multilevel converter arrangement. The multilevel converter arrangement includes converter bridges 16 of cells 18 connected in series, each converter cell 18 including a pair of series connected IGBTs 20 connected in parallel with a capacitor 22. Each converter cell 18 is switched at a different time and such an arrangement eliminates the problems associated with the direct switching of series connected IGBTs because the individual converter cells 18 do not switch simultaneously and converter voltage steps are comparatively small.

The capacitor 22 of each converter cell 18 must however have a high capacitive value to constrain the voltage variation at the capacitor terminals in the multilevel converter arrangement. Six DC side reactors 24 are also required to enable the parallel connection and operation of the converter limbs 26, and are primarily used to limit transient current flow between converter limbs 26.

These factors lead to expensive, large and heavy equipment with significant amounts of stored energy, making pre-assembly, testing and transportation of the equipment difficult.

According to an aspect of the invention, there is provided a voltage source converter for use in high voltage direct current power transmission and reactive power compensation, the voltage source converter comprising three phase elements defining a star connection in which a first end of each phase element is connected to a common junction, each phase element being operably associated in use with a respective phase of a three-phase AC network and including at least one impedance element; at least two converter limbs, each converter limb including first and second DC terminals for connection in use to a DC network and an AC terminal connected in series with a second end of a phase element of the star connection, each converter limb defining first and second limb portions, each limb portion including a chain-link converter connected in series between a respective one of the first and second DC terminals and the respective AC terminal, each chain-link converter including a plurality of chain-link modules connected in series; and a third DC terminal connected between the first and second DC terminals, the third DC terminal being connected to the common junction of the star connection to define an auxiliary connection, wherein in use a current is injected into the auxiliary connection to modify a voltage of each chain-link module in each limb portion.

The provision of current injection into an auxiliary connection between the third DC terminal and the common junction allows decoupling of the AC phase voltages and the DC output voltages to provide independent reactive power flow control in a multi-port HVDC scheme. Conventionally the magnitudes of the AC phase voltages and the DC output voltage share a fixed relationship which arises from the need to constrain the average chain-link module power flow to zero over a fundamental cycle. This leads to a variation of the DC voltage when the converter operates over a range of real and reactive power flows. This variation in DC voltage means that the conventional voltage source converter is unsuitable for independent reactive power flow control in a multi-port HVDC scheme. The current injected into the auxiliary connection however can be used to provide control of the voltage levels of the chain-link modules in each limb portion, and thereby achieve balance between the voltage levels of the individual chain-link modules. This means that there is no need for a fixed relationship between the AC phase voltages and the DC output voltage, and that that the AC side voltage can be variable in the presence of a constant DC output voltage and vice versa.

Preferably at least one DC link capacitor is connected in series between the third DC terminal and each of the first and second DC terminals.

In embodiments of the invention each phase element may include a primary impedance element connected in series with one or more secondary impedance elements, the primary impedance element being provided in the form of a transformer winding.

In other embodiments each phase element may include a primary impedance element provided in the form of a transformer winding and the auxiliary connection includes at least one secondary impedance element.

The star connection may define a secondary side of a transformer in which each transformer winding of the star connection is mutually coupled in use with a respective primary winding at a primary side of the transformer, each primary winding being connected to a respective phase of a three-phase AC network via line inductors. This enables each phase element to be operably associated in use with a respective phase of a three-phase AC network.

The provision of a secondary impedance element results in the generation of an injection current when there is a net voltage provided across the secondary impedance element.

In further embodiments the limb portions of each converter limb may be operable in use to modulate a phase voltage of the respective phase of the three-phase AC network to provide a voltage across the or each secondary impedance element.

Such use of the limb portions, in addition to their use in voltage conversion, removes the need for additional components to provide a voltage drop across the or each secondary impedance element and therefore leads to savings in terms of converter hardware size, weight and costs.

In embodiments of the invention the auxiliary connection may include a secondary impedance element connected in series with a chain-link converter including a plurality of chain-link modules connected in series.

In other embodiments the auxiliary connection may include a secondary impedance element provided in the form of a chain-link converter including a plurality of chain-link modules connected in series.

In such embodiments including a chain-link converter in the auxiliary connection, the chain-link converter of the auxiliary connection may be operable in use to provide a voltage across the or each secondary impedance element.

The provision of a chain-link converter in the auxiliary connection allows zero-voltage switching of the switching elements in each limb portion and prevents the flow of unwanted fundamental currents in the auxiliary connection.

In embodiments of the invention the voltage source converter may include three converter limbs, the AC terminal of each converter limb being connected in series with a second end of a respective phase element of the star connection.

In such voltage source converters, each converter limb operates independently of that of the other converter limbs and therefore only affects the phase connected to the respective AC terminal, and has no influence on the phases connected to the AC terminals of the other converter limbs.

In other embodiments the voltage source converter may further include a chain-link converter connected between a second end of a phase element of the star connection and the third DC terminal, the chain-link converter including a plurality of chain-link modules connected in series.

The provision of a chain-link converter connected between a second end of a phase element of the star connection and the third DC terminal removes the need for a third converter limb and therefore results in savings in terms of hardware size, weight and costs.

Each limb portion preferably further includes at least one switching element connected in series with the chain-link converter.

The provision of at least one switching element in each limb portion allows for the switching of each limb portion into and out of circuit to generate a voltage waveform at the respective AC terminal. The series combination of one or more switching elements connected in series with a chain-link converter in each limb portion to switch the limb portion in and out of circuit between the respective DC terminal and the AC terminal is advantageous because it reduces the voltage range that each chain-link converter would be required to generate. This in turn allows the number of components in each chain-link converter to be minimized, and thereby results in savings in terms of size, weight and cost.

In embodiments of the invention each chain-link module may include at least a pair of switching elements connected in parallel with an energy storage device, the switching elements being operable in use such that each chain of modules connected in series provides a continuously variable voltage source.

When multiple modules are connected in series, a chain-link converter is formed. The use of a chain-link converter is desirable because the chain-link converter can be built up from individual modules to construct different types of voltage waveforms. Higher voltage levels in power transmission can be accommodated by increasing the number of modules in the chain-link converter.

The use of a chain-link type converter allows the use of a converter that is unidirectional (i.e. produces voltage steps in one polarity only) or bidirectional (i.e. produces voltage steps in both positive and negative polarities).

In order to provide a unidirectional single-phase multilevel converter, the switching elements of each module may preferably be connected with the respective energy storage device in a half-bridge arrangement to define a 2-quadrant unipolar module that can develop zero or positive voltage and can conduct current in both directions.

In order to provide a bidirectional single-phase multilevel converter, the switching elements of each module may preferably be connected with the respective energy storage device in a full-bridge arrangement to define a 4-quadrant bipolar module that can develop positive, zero or negative voltage and can conduct current in both directions.

The ability of a 4-quadrant bipolar module to provide positive or negative voltages means that the voltage across the or each chain-link converter may be built up from a combination of modules providing positive or negative voltages. The energy levels in the individual energy storage devices may be maintained therefore at optimal levels by controlling the modules to alternate between positive or negative voltage.

The use of half-bridge and full-bridge modules means that the chain-link modules are capable of conducting alternating current and is therefore suitable for use in voltage converters associated with alternating current.

The energy storage device in each chain-link module is preferably provided in the form of a capacitor, fuel cell, battery or an auxiliary AC generator with an associated rectifier.

Such flexibility is useful in the design of converter stations in different locations where the availability of equipment may vary due to locality and transport difficulties. For example, the energy storage device of each module on an offshore wind farm may be provided in the form of an auxiliary AC generator connected to a wind turbine.

Preferably the or each switching element is a semiconductor device. In such embodiments, the semiconductor device may be an insulated gate bipolar transistor, field-effect transistor, gate turn-off thyristor or integrated gate-commutated transistor.

The use of semiconductor devices is advantageous because such devices are small in size and weight and have relatively low power dissipation, which minimises the need for cooling equipment. It therefore leads to significant reductions in power converter cost, size and weight.

In embodiments of the invention each limb portion may be operable to modify the voltage waveform at the AC terminal to present a near-approximation of a sinusoidal voltage waveform to the respective phase element of the star connection.

The presentation of a near-perfect sine-wave, with minimal harmonic distortion, at the respective AC terminal means that there is therefore no requirement for harmonic filters on the AC side of the voltage source converter to control power quality.

In other embodiments the current injected in use into the auxiliary connection may be a zero-phase sequence triplen harmonic current.

In other embodiments the chain-link converter in each limb portion may be operable to generate a voltage to oppose the flow of current created by a fault in the AC or DC network.

The chain-link modules may be switched into circuit to provide the opposing voltage required to extinguish the fault current and thereby prevent damage to the voltage source converter components. Such use of the chain-link modules to carry out both voltage conversion and extinguishment of fault currents may simplify or eliminate the need for separate protective circuit equipment, such as a circuit breaker or isolator. This leads to savings in terms of hardware size, weight and costs.

Preferably each phase element of the star connection is mutually coupled in use with a respective primary winding in which a first end of each primary winding is connected to a second end of a different primary winding such that the interconnection of the primary windings define a closed loop, and each junction between two primary windings is connected to a respective phase of a three-phase AC network.

Each phase element of the star connection is preferably mutually coupled in use with a respective tertiary winding in which a first end of each tertiary winding is connected to a second end of a different tertiary winding such that the interconnection of the tertiary windings define a closed loop, and each junction between two tertiary windings is connected to an auxiliary network.

The lack of a neutral wire in a delta connection prevents the zero-sequence currents from travelling into a neutral wire. This means that the zero-sequence currents become trapped in the loop formed by the windings defining the delta connection and cannot enter the AC network.

Preferred embodiments of the invention will now be described, by way of non-limiting examples, with to the accompanying drawings in which.

Figure 2:
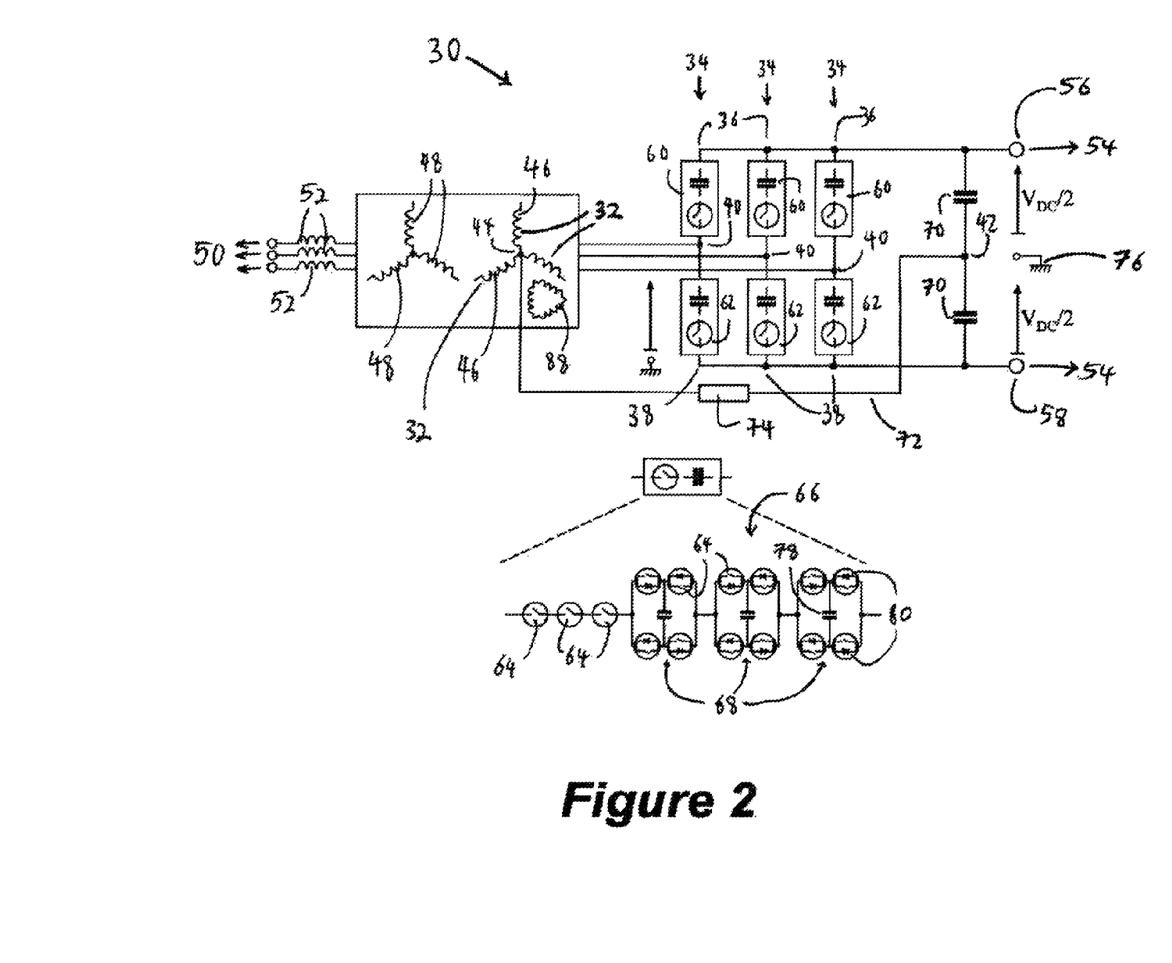
FIG. 2 shows, in schematic form, a voltage source converter according to a first embodiment of the invention.

A voltage source converter 30 according to a first embodiment of the invention is shown in FIG. 2.

The voltage source converter 30 includes three phase elements 32, three converter limbs 34, each converter limb 34 including first and second DC terminals 36,38, an AC terminal 40, and a third DC terminal 42.

The three phase elements 32 define a star connection in which a first end of each phase element 32 is connected to a common junction 44 which is known as a star point. Each phase element 32 includes a primary impedance element in the form of a transformer winding 46. The star connection may define a secondary side of a transformer in which each transformer winding 46 of the star connection is mutually coupled in use with a respective primary winding 48 at a primary side of the transformer, each primary winding 48 being connected to a respective phase of a three-phase AC network 50 via line inductors 52. This enables each phase element 32 to be operably associated in use with a respective phase of the three-phase AC network 50. The primary windings 48 at the primary side of the transformer may be interconnected using a star connection in a similar manner to the star connection of the voltage source converter 30.

The first and second DC terminals 36,38 of each converter limb 34 are for connection in use to a DC network 54. The AC terminal 40 of each converter limb 34 is connected in series with a second end of a respective phase element 32 of the star connection.

In use, the first DC terminal 36 is connected to a positive terminal 56 of a DC network 54 which carries a voltage of $+V_{DC}/2$, where $V_{DC}$ is the DC voltage range of the DC network 54. The second DC terminal 38 is connected to a negative terminal 58 of a DC network 54 which carries a voltage of $-V_{DC}/2$.

Each converter limb 34 defines first and second limb portions 60,62, each limb portion 60,62 including at least one switching element 64 and a chain-link converter 66 connected in series between a respective one of the first and second DC terminals 36,38 and the respective AC terminal 40. The or each switching element 64 in each limb portion 60,62 is operable to switch the respective limb portion into and out of circuit.

The switching of the first limb portion 60 into circuit connects the first DC terminal 36 to the AC terminal 40 and thereby results in a voltage of $+V_{DC}/2$ being presented at the AC terminal 40. Similarly the switching of the second limb portion 62 into circuit connects the second DC terminal 38 to the AC terminal 40 and thereby results in a voltage of $-V_{DC}/2$ being presented at the AC terminal 40.

Switching the first and second limb portions 60,62 in and out of circuit therefore allows the voltage at the respective AC terminal 40 to commutate between $+V_{DC}/2$ and $-V_{DC}/2$. This results in the generation of a voltage waveform at the AC terminal 40. The shape of the voltage waveform can be adjusted by varying the periods in which each limb portion 60,62 is switched into or out of circuit.

Preferably each limb portion 60,62 is operable to modify the voltage waveform at the AC terminal 40 to present a near-approximation of a sinusoidal voltage waveform to the respective phase element 32 of the star connection. The chain-link converter 66 in each limb portion 60,62 includes a plurality of chain-link modules 68 connected in series which makes it suitable for use in voltage waveform generation due to its ability to provide voltage steps to increase or decrease the voltage at the AC terminal 40.

Two DC link capacitors 70 are connected in series between the first and second DC terminals 36,38, a junction between the two DC link capacitors 70 defining the third DC terminal 42 which may be connected in use to ground 76 or may be left floating. The third DC terminal 42 is connected to the common junction 44 of the star connection to define an auxiliary connection 72. The auxiliary connection 72 includes a secondary impedance element 74.

In use, under balanced and steady-state conditions, the phase voltages of each AC phase is preferably sinusoidal and have an equal, mutual phase displacement and magnitude. These phase voltages are taken with respect to a notional ground 76 which is at the third DC terminal 42. The magnitude and phase of the phase voltages are used to control the real power flow between the AC and DC networks 50,54 and reactive power exchange with the AC network 50.

Each chain-link module 68 of the chain-link converter 66 of each limb portion 60,62 includes two pairs of switching elements 64 connected in parallel with a capacitor 78, the switching elements 64 being operable in use such that the chain of modules 68 connected in series provides a continuously variable voltage source. The switching elements 64 of each chain-link module 68 are connected with the respective capacitor 78 in a full-bridge arrangement to define a 4-quadrant bipolar module 68 that can develop positive, zero or negative voltage and can conduct current in both directions.

The ability of a 4-quadrant bipolar module 68 to provide positive or negative voltages means that the voltage across each chain-link converter 66 may be built up from a combination of modules 68 providing positive or negative voltages.

The energy levels in the individual capacitors 78 may be maintained therefore at optimal levels by controlling the modules 68 to alternate between providing positive or negative voltage.

It is envisaged that in other embodiments the switching elements 64 of each chain-link module 68 are connected with the respective capacitor 78 in a half-bridge arrangement to define a 2-quadrant unipolar module 68 that can develop zero or positive voltage and can conduct current in both directions.

The capacitor 78 of each module 68 may be bypassed or inserted into the chain-link converter 66 by changing the state of the switching elements 64.

A capacitor 78 of a module 68 is bypassed when a pair of switching elements 64 is configured to form a short circuit in the module 68, causing the current in the voltage source converter 30 to pass through the short circuit and bypass the capacitor 78.

A capacitor 78 of a module 68 is inserted into the chain-link converter 66 when the pair of secondary switching elements 64 is configured to allow the converter current to flow into and out of the capacitor 78, which is then able to charge or to discharge its stored energy and provide a voltage.

It is therefore possible to build up a combined voltage across the chain-link converter 66 which is higher than the voltage available from each of the individual modules 68 via the insertion of the capacitors 78 of multiple modules 68, each providing its own voltage, into the chain-link converter 66.

Figure 3:
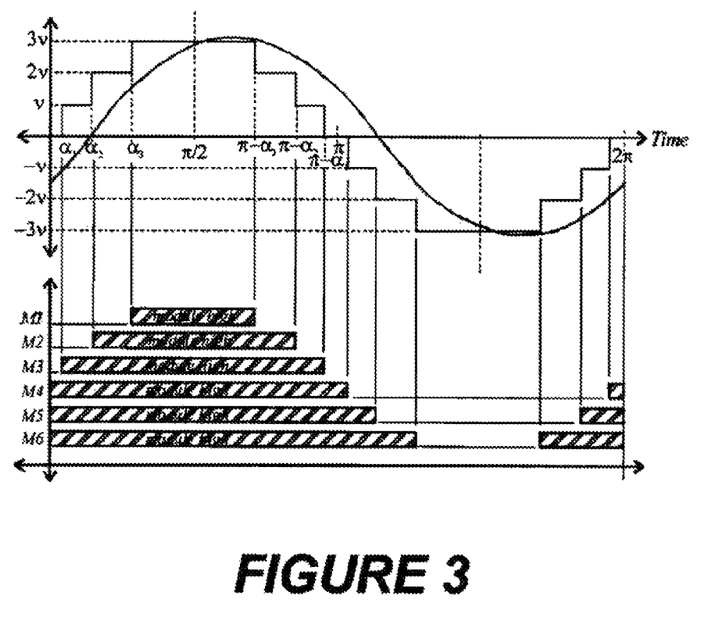
FIG. 3 shows a synthesis of a 50 Hz sinusoidal waveform by a chain-link converter.

It is also possible to vary the timing of switching operations for each module 68 such that the insertion and/or bypass of the capacitors 78 of individual modules 68 in the chain-link converter 66 results in the generation of a voltage waveform. An example of a voltage waveform generated using the chain-link converter 66 is shown in FIG. 3, in which the insertion of the capacitors 78 of the individual modules 68 is staggered to generate a 50 Hz sinusoidal waveform. Other waveform shapes may be generated by adjusting the timing of switching operations for each module 68 in the chain-link converter 66.

In the embodiment shown in FIG. 1, each switching element 64 is accompanied by a reverse-parallel connected diode 80.

It is envisaged that in other embodiments each switching element 64 may include a different semiconductor device, such as an insulated gate bipolar transistor, a field effect transistor, gate-turn-off thyristor, integrated gate-commutated transistor or other forced commutated or self commutated semiconductor switches. Each semiconductor device may be accompanied by a reverse-parallel connected diode 80.

It is also envisaged that in other embodiments, the capacitor 78 of each chain-link module 68 may be replaced by a different energy storage device such as a fuel cell, a battery or an auxiliary AC generator with an associated rectifier.

As previously described, the switching operations in the chain-link modules 68 may be configured so that the insertion and bypass of the capacitors 78 are staggered to form a near-approximation of a sinusoidal waveform. The step-wise approximation of the voltage waveform may be improved by using a higher number of modules 68 with lower voltage levels to increase the number of voltage steps.

Normally the switching element 64 of the first limb portion 60 is closed while the switching element 64 of the second limb portion 62 is open. The chain-link converter 66 in the first limb portion 60 is controlled to provide a voltage of $V_{DC}/2$ so that it opposes the voltage at the positive terminal 56 of the DC network 54. The output voltage at the AC phase connection terminal 40 is therefore zero volts i.e. halfway between the positive DC voltage at the positive terminal 56 $V_{DC}/2$, and the negative DC voltage at the negative terminal 58, $-V_{DC}/2$. Any unused chain-link modules 68 are left in bypass mode.

In order to generate the positive voltage component of the sinusoidal voltage waveform, the output voltage is slowly increased by reducing the number of inserted capacitors 78 of modules 68 in the chain-link converter 66 and thereby reducing the chain-link converter voltage. The change in the chain-link converter voltage can be observed in the step-wise increments of the output voltage at the AC terminal 40. At the peak of the positive voltage component the chain-link converter 66 may be bypassed to produce a peak value equal to the positive DC voltage $+V_{DC}/2$, or it may produce a voltage that adds to the positive DC voltage of the DC network 54. The positive voltage component produced may therefore have a peak that is higher than the positive DC voltage of the DC network 54, if desired.

During the generation of the positive voltage component of the sinusoidal voltage waveform, the voltage across the second limb portion 62 is equal to the difference between the output voltage and the negative DC voltage at the negative terminal 58, $-V_{DC}/2$ of the DC network 54.

The chain-link converter 66 of the first limb portion 60 is then controlled to reduce the output voltage in step-wise decrements by controlling the combined voltage across the chain-link converter 66 until the output voltage returns to zero.

When the output voltage returns to zero, the switching element 64 in the first limb portion 60 can remain closed when the switching element 64 of the second limb portion 62 is closed and before the switching element 64 in the first limb portion 60 is opened. This temporary over-lap period provides a method of connecting a number of modules 68 directly in parallel with the DC network 54 and provides a convenient method of resetting any drift in the capacitor voltage level.

The full voltage range of the DC network 54, $V_{DC}$, is opposed by the voltage provided by the chain-link converters 66 in both limb portions during the switching operations of both switching elements 64 from one state to the other.

The chain-link converter 66 in the first limb portion 60 is controlled to provide a voltage of $+V_{DC}/2$ while the chain-link converter 66 in the second limb portion 62 is controlled to provide a voltage of $-V_{DC}/2$. As a result, there is zero or minimal voltage across the switching elements 64 of the first and second limb portions 60, 62 when the switching elements 64 switch from one state to the other. The low voltage across the switching elements 64 of each of the limb portions leads to low switching losses.

The generation of the negative voltage component of the sinusoidal waveform is similar to the generation of the positive voltage component except that the switching element 64 of the first limb portion 60 remains open and the switching element 64 of the second limb portion 62 remains closed, and the generation of the voltage waveform is caused by the insertion and bypass of modules 68 in the chain-link converter 66 of the second limb portion 62.

During generation of the negative voltage component of the sinusoidal voltage waveform, the voltage across the first limb portion 60 is equal to the difference between the output voltage and the positive DC voltage at the positive terminal 56 $+V_{DC}/2$ of the DC network 54.

In use a current is injected into the auxiliary connection 72 to modify a voltage of each chain-link module 68 in each limb portion 60, 62 to achieve capacitor voltage balance between the individual chain-link modules 68. The current may be generated by providing a net voltage across the or each secondary impedance element 74.

In use the limb portions of each converter limb 34 may be operable to modulate a phase voltage of the respective phase of the three-phase AC network 50 to provide a voltage across the or each secondary impedance element 74 of the auxiliary connection 72. Such operation of the limb portions involves the use of the or each switching element 64 and the chain-link converter 66 of the respective limb portion to carry out the modulation of the respective phase voltage.

The ability of the chain-link converter 66 to generate voltage waveforms may be used to provide a third-harmonic modulating voltage to add to the phase voltages such that the net voltage across the or each secondary impedance element 74 results in the generation of a zero-phase sequence triplen harmonic current.

The effect of injecting a zero-phase sequence triplen harmonic current into the auxiliary connection 72 can be seen in FIGS. 4a to 4f.

Figure 4A:
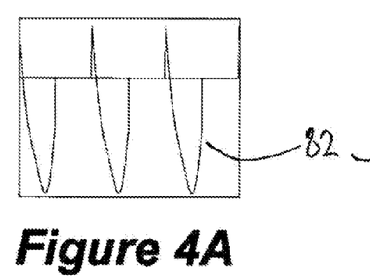
FIGS. 4A to 4F show the effect of current injection on the stored energy levels of chain-link modules in the limb portions.
Figure 4B:
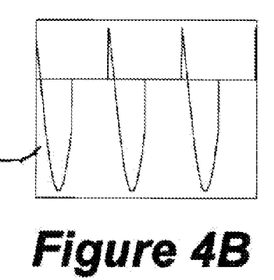
Figure 4C:
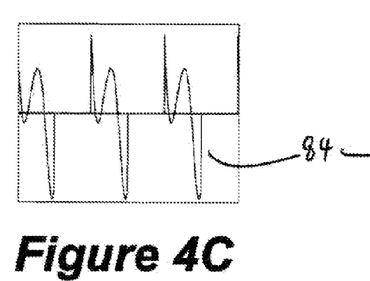
Figure 4D:
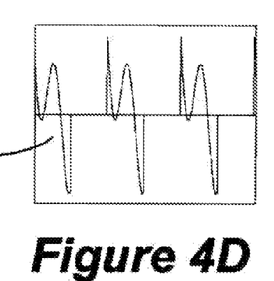

In respect of FIGS. 4a to 4f, the AC phase voltages and the DC output voltage do not share a fixed relationship, as seen in Equation (1), required to constrain the average chain-link capacitor power flow to zero over a fundamental cycle.

$$V_{DC} = \frac{\pi |V_{R,Y,B}|}{2} \quad (1)$$

Where $V_{DC}$ is the DC output voltage; and $V_R$, $V_Y$ and $V_B$ are the respective AC phase voltages FIGS. 4a and 4b respectively show the current levels 82 of a chain-link module 68 during operation of a voltage source converter 30 with and without the use of current injection, while FIGS. 4c and 4d respectively show the power levels 84 of the chain-link module 68 during the operation of the voltage source converter 30 with and without the use of current injection. It can be seen that the injection of current has minimal effect on the current and power levels 82,84 of a chain-link module 68 during operation of a voltage source converter 30.

Figure 4E:
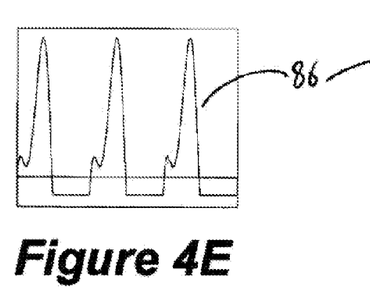
Figure 4F:
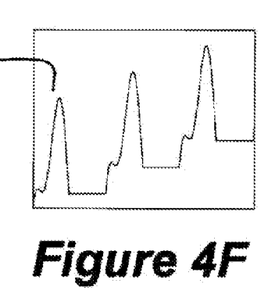

FIGS. 4e and 4f respectively show the stored energy levels 86 of a capacitor 78 in the chain-link module 68 during operation of a voltage source converter 30 with and without the use of current injection. It can be seen that without the use of current injection, the stored energy of the capacitor 78 increases with time.

The provision of an injected current in the auxiliary connection 72 therefore allows modification of the voltage of each chain-link module 68 to achieve capacitor voltage balance between individual chain-link modules 68 in the same chain-link converter 66. As a result the AC phase voltages and the DC output voltage may be decoupled because there is no need for a fixed relationship between the AC phase voltages and the DC output voltage in order to constrain the average chain-link capacitor power flow to zero over a fundamental cycle.

In embodiments of the invention the auxiliary connection 72 may include a secondary impedance element 74 connected in series with a chain-link converter 66 including a plurality of chain-link modules 68 connected in series. Alternatively the auxiliary connection 72 may include a secondary impedance element 74 provided in the form of a chain-link converter 66 including a plurality of chain-link modules 68 connected in series.

In use the chain-link converter 66 of the auxiliary connection 72 may be operable to provide a voltage across the or each secondary impedance element 74. The use of a chain-link converter 66 in the auxiliary connection 72 to provide the voltage across the or each secondary impedance element 74 allows zero-voltage switching of the switching elements 64 in the respective limb portions which is not possible when using the limb portions 60,62 to modulate the AC phase voltages.

In other embodiments it is envisaged that each phase element 32 may include a primary impedance element connected in series with one or more secondary impedance elements 74, the primary impedance element being provided in the form of a transformer winding 46. The inclusion of one or more secondary impedance elements 74 in the respective phase element 32 means that the secondary impedance element 74 in the auxiliary connection 72 can be omitted. The secondary impedance element 74 of each phase element 32 may be provided in the form of a line inductor 52. In use a current is injected into the auxiliary connection 72 by modulating the respective phase voltage or using the chain-link converter 66 to provide a net voltage across each secondary impedance element 74 in the respective phase element 32.

The zero-phase sequence currents may be prevented from entering the AC network 50 by arranging the primary windings 48 at a primary side of the transformer to define a delta connection. The delta connection is formed by connecting a first end of each primary winding 48 to a second end of a different primary winding 48 such that the interconnection of the three primary windings 48 forms a closed loop, and by connecting each junction between two primary windings 48 to a respective phase of the three-phase AC network 50. Alternatively each phase element 32 of the star connection may be operably associated in use with a respective tertiary winding 88 connected to an auxiliary network, the three tertiary windings 88 being interconnected to define a delta connection.

The lack of a neutral wire in a delta connection prevents the zero-sequence currents from travelling into a neutral wire. This means that the zero-sequence currents become trapped in the loop formed by the windings defining the delta connection and cannot enter the AC network 50.

Figure 5:
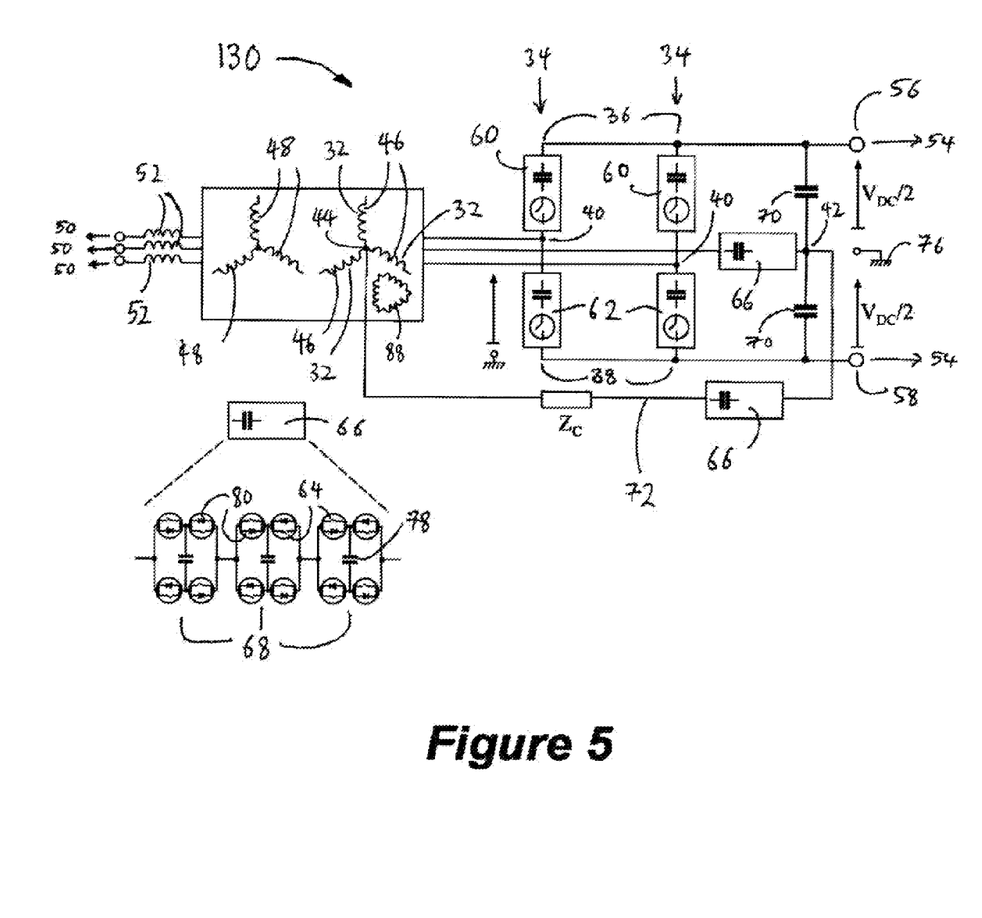
FIG. 5 shows, in schematic form, a voltage source converter according to a second embodiment of the invention.

FIG. 5 shows a voltage source converter 130 according to a second embodiment of the invention. The second voltage source converter 130 has the same structure as the embodiment shown in FIG. 2 except that the second voltage source converter 130 includes two converter limbs 34 instead of three converter limbs 34.

Each of the two converter limbs 34 includes first and second DC terminals 36,38 for connection in use to a DC network 54 and an AC terminal 40 connected in series with a second end of a respective one of first and second phase elements 32 of the star connection. The second voltage source converter 130 further includes a chain-link converter 66 connected between a second end of a third phase element 32 of the star connection and the third DC terminal 42, the chain-link converter 66 including a plurality of chain-link modules 68 connected in series.

In use the fundamental modulation voltages applied to the phases connected to the converter limbs 34 are boosted by $\sqrt{2}$ and the phase shifted by +/−30° such that the phase of each phase element 32 is displaced by 60° relative to the phases of the other phase elements 32. This therefore allows the second voltage source converter 130 to operate in the same manner as the first voltage source converter shown in FIG. 2 in terms of real and reactive power flow.

A current is injected in use into the auxiliary connection 72 by applying a third-harmonic modulation voltage to the phases associated with the first and second phase elements 32 connected to the converter limbs 34. The chain-link converter 66 between the third phase element 32 of the star connection and the third DC terminal 42 is modulated with the same third-harmonic modulation voltage to ensure that in use balanced zero-sequence currents are injected into the star connection.

In use, when the star-point of the star connection is at the phase voltage of the connection between the second end of the third phase element 32 and the third DC terminal 42 with respect to ground 76, an unwanted fundamental current flows through the auxiliary connection 72. The auxiliary connection 72 may include a chain-link converter 66 connected in series with the secondary impedance element 74, the chain-link converter 66 being operable to back off the phase voltage at the star-point which appears across the secondary impedance element 74.

In respect of the voltage source converters 30,130 shown in FIGS. 2 and 5, the chain-link converter 66 in each limb portion 60,62 is operable to generate a voltage to oppose the flow of current created by a fault in the AC or DC networks 50,54.

The modules 68 of the chain-link converters 66 may be switched into circuit to provide the opposing voltage to extinguish the fault current and thereby prevent damage to the voltage source converter components.

In the event of a fault in the DC network 54 resulting in fault current in the voltage source converter 30,130, the switching elements 64 of each chain-link module 68 of the chain-link converters 66 in each limb portion 60,62 may be operated to insert the full-bridge modules 68 to provide a voltage which opposes the driving voltage of the non-faulty AC network 50 and thereby reduces the fault current in the voltage source converter 30,130.

For example, a short circuit occurring across the DC link capacitors 70 connected to the DC network 54 results in both voltages at the positive and negative terminals 56,58 dropping to zero volts. When this happens, a high fault current can flow from the AC network 50 through the first limb portion 60 of the converter limb 34, and return to the AC network 50 through the short circuit and the second limb portion 62 of the converter limb 34.

The low impedance of the short circuit means that the fault current flowing in the voltage source converter 30,130 may exceed the current rating of the voltage source converter 30,130.

The fault current may be minimized by opposing the driving voltage from the AC network 50. This is carried out by configuring the switching elements 64 of each chain-link module 68 such that the modules 68 are inserted into the respective AC side chain-link converter 66 to provide a voltage which opposes and thereby reduces the driving voltage.

The invention claimed is:

1. A voltage source converter for use in high voltage direct current power transmission and reactive power compensation, the voltage source converter comprising three phase elements defining a star connection in which a first end of each phase element is connected to a common junction, each phase element being operably associated in use with a respective phase of a three-phase AC network and including at least one impedance element; at least two converter limbs, each converter limb including first and second DC terminals for connection in use to a DC network and an AC terminal connected in series with a second end of a phase element of the star connection, each converter limb defining first and second limb portions, each limb portion including a chain-link converter connected in series between a respective one of the first and second DC terminals and the respective AC terminal, each chain-link converter including a plurality of chain-link modules connected in series; and a third DC terminal connected between the first and second DC terminals, the third DC terminal being connected to the common junction of the star connection to define an auxiliary connection, wherein in use a current is injected into the auxiliary connection to achieve balance between the voltage levels of the individual chain-link modules of each chain-link converter of each limb portion.

2. A voltage source converter according to claim 1 further including at least one DC link capacitor connected in series between the third DC terminal and each of the first and second DC terminals.

3. A voltage source converter according to claim 1 wherein each phase element includes a primary impedance element connected in series with one or more secondary impedance elements, the primary impedance element being provided in the form of a transformer winding.

4. A voltage source converter according to claim 1 wherein each phase element includes a primary impedance element provided in the form of a transformer winding and the auxiliary connection includes at least one secondary impedance element.

5. A voltage source converter according to claim 1 wherein the limb portions of each converter limb are operable in use to modulate a phase voltage of the respective phase of the three-phase AC network to provide a voltage across each secondary impedance element.

6. A voltage source converter according to claim 1 wherein the auxiliary connection includes a secondary impedance element connected in series with an additional chain-link converter between the common junction and the third DC terminal, said additional chain-link converter including a plurality of chain-link modules connected in series.

7. A voltage source converter according to claim 1 wherein the auxiliary connection includes a secondary impedance element provided in the form of an additional chain-link converter between the common junction and the third DC terminal, said additional chain-link converter including a plurality of chain-link modules connected in series.

8. A voltage source converter according to claim 6 wherein the additional chain-link converter of the auxiliary connection is operable in use to provide a voltage across each secondary impedance element.

9. A voltage source converter according to claim 1 wherein the voltage source converter includes three converter limbs, the AC terminal of each converter limb being connected in use to a second end of a respective phase element of the star connection.

10. A voltage source converter according to claim 1 wherein the voltage source converter further includes a chain-link converter connected between a second end of a phase element of the star connection and the third DC terminal, the chain-link converter including a plurality of chain-link modules connected in series.

11. A voltage source converter according to claim 1 wherein each limb portion further includes at least one switching element connected in series with the chain-link converter, each switching element being operable to switch the limb portion into and out of circuit.

12. A voltage source converter according to claim 1 wherein each chain-link module includes at least a pair of switching elements connected in parallel with an energy storage device, the semiconductor switches being operable in use such that each chain of modules connected in series provides a continuously variable voltage source.

13. A voltage source converter according to claim 12 wherein the switching elements of each chain-link module are connected with the respective energy storage device in a half-bridge arrangement to define a 2-quadrant unipolar module that can develop zero or positive voltage and can conduct current in both directions.

14. A voltage source converter according to claim 12 wherein the switching elements of each chain-link module are connected with the respective energy storage device in a full-bridge arrangement to define a 4-quadrant bipolar module that can develop positive, zero or negative voltage and can conduct current in both directions.

15. A voltage source converter according to claim 12 wherein the energy storage device in each chain-link module is provided in the form of a capacitor, fuel cell, battery or an auxiliary AC generator with an associated rectifier.

16. A voltage source converter according to claim 11 wherein each switching element includes a semiconductor device.

17. A voltage source converter according to claim 16 wherein the semiconductor device is an insulated gate bipolar transistor, field-effect transistor, gate turn-off thyristor or integrated gate-commutated transistor.

18. A voltage source converter according to claim 1 wherein each limb portion is operable to modify the voltage waveform at the AC terminal to present a near-approximation of a sinusoidal voltage waveform to the respective phase element of the star connection.

19. A voltage source converter according to claim 1 wherein the current injected in use into the auxiliary connection is a zero-phase sequence triple harmonic current.

20. A voltage source converter according to claim 1 wherein the chain-link converter in each limb portion is operable to generate a voltage to oppose the flow of current created by a fault in the AC or DC network.

21. A voltage source converter according to claim 1 wherein each phase element of the star connection is mutually coupled in use with a respective primary winding in which a first end of each primary winding is connected to a second end of a different primary winding such that the interconnection of the primary windings define a closed loop, and each junction between two primary windings is connected to a respective phase of a three-phase AC network.

22. A voltage source converter according to claim 1 wherein each phase element of the star connection is mutually coupled in use with a respective tertiary winding in which a first end of each tertiary winding is connected to a second end of a different tertiary winding such that the interconnection of the tertiary windings define a closed loop, and each junction between two tertiary windings is connected to an auxiliary network.

* * * * *